(12) United States Patent
Tamura

(10) Patent No.: US 10,244,136 B2
(45) Date of Patent: Mar. 26, 2019

(54) IMAGE FORMING APPARATUS AND IMAGE FORMING SYSTEM THAT DETERMINE WHETHER TO SET IMAGE FORMING APPARATUS IN RESERVED STATE BASED ON COMMUNICATION WITH REQUESTING DEVICE TRANSMITTING CONFIRMATION REQUEST THAT IS A REQUEST TO CONFIRM USE STATUS OF IMAGE FORMING APPARATUS

(71) Applicant: KYOCERA Document Solutions Inc., Osaka (JP)

(72) Inventor: Takashi Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/854,210

(22) Filed: Dec. 26, 2017

(65) Prior Publication Data

US 2018/0183964 A1 Jun. 28, 2018

(30) Foreign Application Priority Data

Dec. 28, 2016 (JP) ................................. 2016-256008

(51) Int. Cl.
*H04N 1/00* (2006.01)
*H04N 1/44* (2006.01)

(52) U.S. Cl.
CPC ..... *H04N 1/00915* (2013.01); *H04N 1/00307* (2013.01); *H04N 1/00482* (2013.01); *H04N 1/00514* (2013.01); *H04N 1/00925* (2013.01); *H04N 1/4413* (2013.01); *H04N 2201/0094* (2013.01)

(58) Field of Classification Search
CPC .................................................. H04N 1/00915
USPC ......................................................... 358/1.15
See application file for complete search history.

(56) References Cited

U.S. PATENT DOCUMENTS

| 6,785,727 B1 | 8/2004 | Yamazaki |
| 2003/0208607 A1 | 11/2003 | Yamazaki |
| 2013/0222840 A1* | 8/2013 | Hosoda .............. H04N 1/00204 358/1.14 |
| 2018/0157449 A1* | 6/2018 | Nobutani .............. G06F 3/1286 |

FOREIGN PATENT DOCUMENTS

JP 2000-242460 A 9/2000

* cited by examiner

*Primary Examiner* — Jacky X Zheng
(74) *Attorney, Agent, or Firm* — Studebaker & Brackett PC

(57) ABSTRACT

An operation panel of an image forming apparatus receives in a login state and does not receive in a logout state a job setting instruction, etc. When a communication section receives a confirmation request to confirm use status of the image forming apparatus, a controller of the image forming apparatus specifies a requester who is a user of a communication device having transmitted the confirmation request and determines whether the image forming apparatus is to be set in a reserved state based on communication with the communication device. When a user information set of the requester is input in a state in which the image forming apparatus is in the reserved state, the controller causes the operation panel to transition from the logout state to the login state. The controller refuses additional login from a user other than the requester during the image forming apparatus being in the reserved state.

14 Claims, 8 Drawing Sheets

| Date | User | Reservation cancel |
|---|---|---|
| 20AA/AA/AA aa:aa | abcdef | ○ |
| 20BB/BB/BB bb:bb | bcdefg | - |
| 20CC/CC/CC cc:cc | cdefgh | - |
| 20DD/DD/DD dd:dd | defghi | ○ |
| ⋮ | ⋮ | ⋮ |

FIG. 9

Reservation detail setting screen

Username [abcdef]  [User selection]—K7

1. Reservation of multifunction peripheral  C1  K8—[Allow]  [Disallow]—K9

2. Reference distance  C2  [15] m
※Reserve when more distant than reference distance 3. Determination by referencing reservation history  K10  [On]  [Off]—K11
※Not canceled when reservation cancel is entered consecutively

[Cancel]  [Register]

FIG. 10

IMAGE FORMING APPARATUS AND IMAGE FORMING SYSTEM THAT DETERMINE WHETHER TO SET IMAGE FORMING APPARATUS IN RESERVED STATE BASED ON COMMUNICATION WITH REQUESTING DEVICE TRANSMITTING CONFIRMATION REQUEST THAT IS A REQUEST TO CONFIRM USE STATUS OF IMAGE FORMING APPARATUS

INCORPORATION BY REFERENCE

The present application claims priority under 35 U.S.C. § 119 to Japanese Patent Application No. 2016-256008, filed on Dec. 28, 2016. The contents of this application are incorporated herein by reference in their entirety.

BACKGROUND

The present disclosure relates to an image forming apparatus capable of being reserved and an image forming system.

An image forming apparatus is used for outputting and printing based on an original document or data. The image forming apparatus includes a multifunction peripheral, a printer, a copier, and a facsimile machine. It is known that some image forming apparatus is capable of being reserved for use thereof.

Specifically, a plurality of users share the image forming apparatus. The image forming apparatus receives a setting for reservation in a time zone for processing a job and a setting for controlling the job in the reserved time zone. The image forming apparatus processes the job of a user who sets reservation according to the settings in the reserved time zone prior to a job of any other user.

SUMMARY

An image forming apparatus according to the present disclosure includes a communication section, an operation panel, a job executing section, an information input section, storage, and a controller. The communication section communicates with one or more communication devices. The operation panel receives a job setting instruction to set a job and a job execution start instruction to start execution of the job. The job executing section executes the job. The storage pre-stores therein respective user information sets of one or more users. The information input section receives input of a user information set of a user among the one or more users. The controller performs matching between the user information set input to the information input section and the user information sets pre-stored in the storage for user authentication. The operation panel in a logout state does not receive the job setting instruction and the job execution start instruction. The operation panel in a login state receives the job setting instruction and the job execution start instruction. Upon the communication section receiving a confirmation request that is a request to confirm use status of the image forming apparatus from one of the one or more communication devices, the controller specifies based on communication with a requesting device a requester who is a user of the requesting device as the one of the one or more communication devices that has transmitted the confirmation request. The controller determines whether or not the image forming apparatus is to be set in a reserved state based on communication with the requesting device. Upon determination that the image forming apparatus is to be set in the reserved state, the controller sets the image forming apparatus to be in the reserved state. Upon determination that the image forming apparatus is not to be set in the reserved state, the controller does not set the image forming apparatus to be in the reserved state. When a user information set of the requester is input to the information input section in a state in which the image forming apparatus is in the reserved state, the controller causes the operation panel to transition from the logout state to the login state. During the time when the image forming apparatus is in the reserved state, the controller refuses additional login from a user other than the requester.

An image forming system according to the present disclosure includes one or more communication devices and an image forming apparatus. The image forming apparatus includes a communication section, an operation panel, a job executing section, an information input section, storage, and a controller. The communication section communicates with the one or more communication devices. The operation panel receives a job setting instruction to set a job and a job execution start instruction to start execution of the job. The job executing section executes the job. The storage pre-stores therein respective user information sets of one or more users. The information input section receives input of a user information set of a user among the one or more users. The controller performs matching between the user information set input to the information input section and the user information sets pre-stored in the storage for user authentication. The operation panel in a logout state does not receive the job setting instruction and the job execution start instruction. The operation panel in a login state receives the job setting instruction and the job execution start instruction. Upon the communication section receiving a confirmation request that is a request to confirm use status of the image forming apparatus from one of the one or more communication devices, the controller specifies based on communication with a requesting device a requester who is a user of the requesting device as the one of the one or more communication devices that has transmitted the confirmation request. The controller determines whether or not the image forming apparatus is to be set in a reserved state based on communication with the requesting device. Upon determination that the image forming apparatus is to be set in the reserved state, the controller sets the image forming apparatus to be in the reserved state. Upon determination that the image forming apparatus is not to be set in the reserved state, the controller does not set the image forming apparatus to be in the reserved state. When a user information set of the requester is input to the information input section in a state in which the image forming apparatus is in the reserved state, the controller causes the operation panel to transition from the logout state to the login state. During the time when the image forming apparatus is in the reserved state, the controller refuses additional login from a user other than the requester.

BRIEF DESCRIPTION OF THE DRAWINGS

FIG. 9 indicates an example of reservation history data stored in storage of the multifunction peripheral according to the embodiment of the present disclosure.

FIG. 10 is a diagram illustrating an example of a reservation detail setting screen of the multifunction peripheral according to the embodiment of the present disclosure.

DETAILED DESCRIPTION

The following describes an image forming apparatus, communication devices 2, and an image forming system 100 according to an embodiment of the present disclosure with reference to FIGS. 1-10. A multifunction peripheral 1 will be described as an example of the image forming apparatus in the present description. Note that elements of the present embodiment such as configuration and positioning are merely examples provided to facilitate explanation and do not in any way limit the scope of the present disclosure. In the following description, a communication device 2 that has transmitted a confirmation request to confirm use status of the multifunction peripheral 1 to the multifunction peripheral 1 is referred to as a "requesting device". A user using the requesting device is referred to as a "requester".

(General Configuration of Image Forming System)

Figure 1:
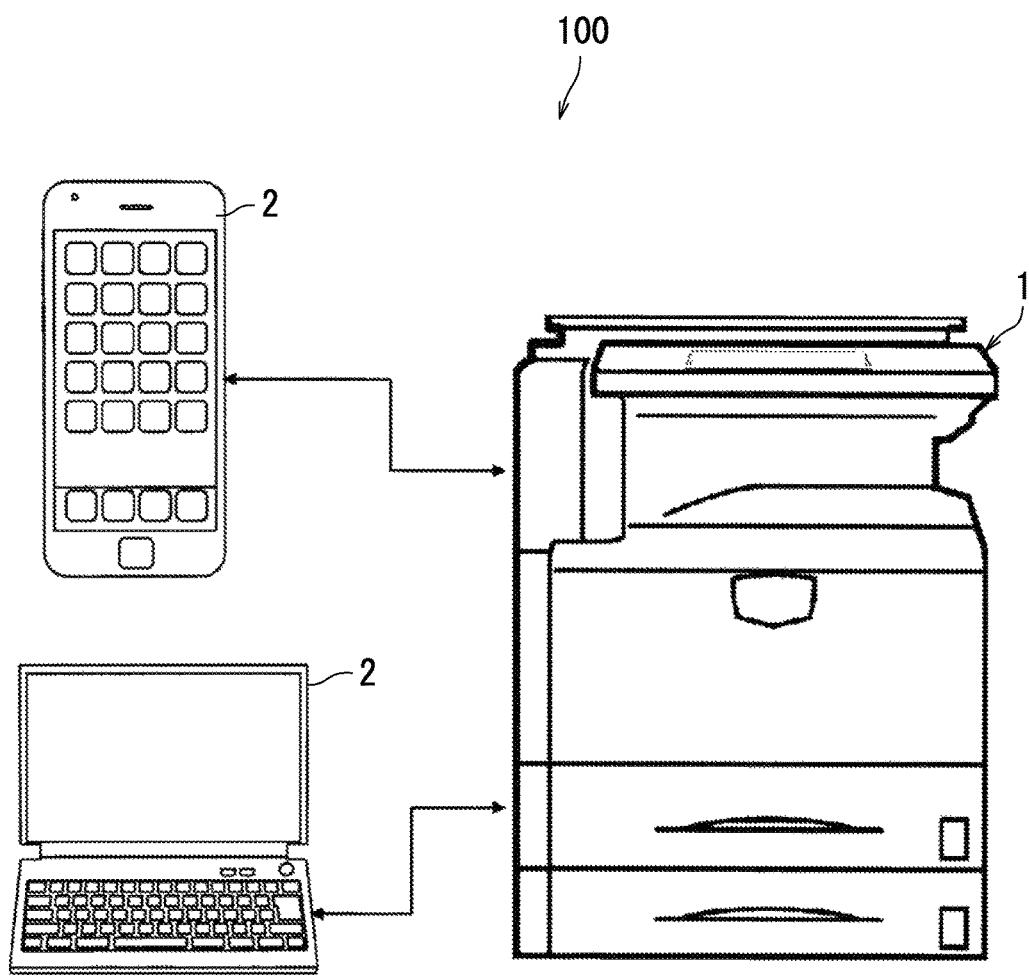
FIG. 1 is a diagram illustrating an example of an image forming system according to an embodiment of the present disclosure.

First of all, an example of the image forming system 100 according to an embodiment of the present disclosure will be described with reference to FIG. 1. FIG. 1 is a diagram illustrating an example of the image forming system 100.

The image forming system 100 includes the multifunction peripheral 1. The image forming system 100 further includes one or more communication devices 2. The communication devices 2 each are a device capable of communicating with the multifunction peripheral 1. The communication devices 2 each are for example a smartphone, a tablet computer, or a personal computer (PC). A smartphone and a PC are illustrated as the communication devices 2 in FIG. 1. The multifunction peripheral 1 is capable of transmitting and receiving data to and from the smartphone or the tablet computer through wireless communication. The multifunction peripheral 1 is also capable of transmitting and receiving data to and from the PC through a cable network or a wireless network.

(Image Forming Apparatus)

Figure 2:
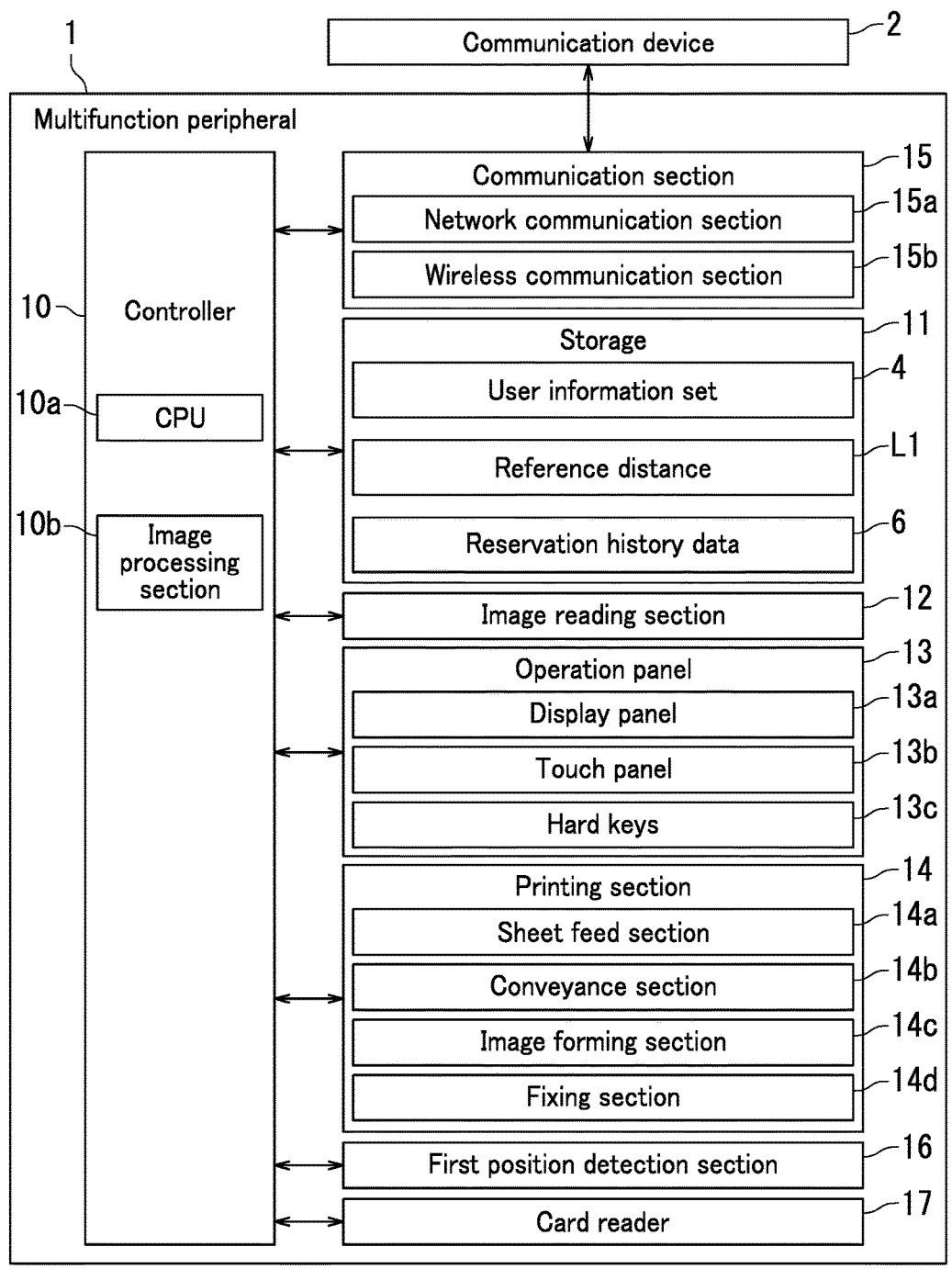
FIG. 2 is a block diagram illustrating an example of a multifunction peripheral according to the embodiment of the present disclosure.

An example of the multifunction peripheral 1 according to the embodiment of the present disclosure will be described next with reference to FIG. 2. FIG. 2 is a diagram illustrating an example of the multifunction peripheral 1.

The multifunction peripheral 1 includes a controller 10, storage 11, an image reading section 12 (corresponding to a job executing section), an operation panel 13 (corresponding to an information input section), a printing section 14 (corresponding to the job executing section), a communication section 15 (corresponding to the job executing section), a first position detection section 16, and a card reader 17 (corresponding to the information input section).

The controller 10 controls overall operation of the multifunction peripheral 1. The controller 10 includes a central processing unit (CPU) 10a and an image processing section 10b. The storage 11 is a combination of devices such as read only memory (ROM), random access memory (RAM), and a hard disk drive (HDD). The storage 11 sorters various data and control programs therein. The data stored in the storage 11 includes for example control data, setting data, and image data. The CPU 10a controls respective elements (image reading section 12, operation panel 13, printing section 14, communication section 15, first position detection section 16, and card reader 17) of the multifunction peripheral 1 based on the programs or the data stored in the storage 11.

In execution of a job for which a document reading operation is necessary (e.g., a copy job or a scan data transmission job), the controller 10 controls the image reading section 12 to read the image of a document. The image reading section 12 generates image data of the document. The operation panel 13 includes a display panel 13a, a touch panel 13b, and hard keys 13c. The display panel 13a displays a screen or an image. The controller 10 controls the display panel 13a to display an operation image. The operation image is used for receiving input of a job setting instruction. The operation image is for example a soft key or a soft button. The job setting instruction is an instruction to set a job. The job setting instruction is an instruction pertaining to the number of copies and selection between color copy and monochrome copy for example for the copy job, or an instruction pertaining to various conditions for document reading and a transmission target address of read data for example for the scan data transmission job.

The touch panel 13b is disposed on the display panel 13a. The touch panel 13b recognizes the position of a touch. The controller 10 recognizes based on output from the touch panel 13b that an operation image is operated. Through the above, the controller 10 recognizes contents of the user operation (a setting instruction). The controller 10 also recognizes that one of the hard keys 13c is pressed. For example, the operation panel 13 includes a start key that is one of the hard keys 13c. A user inputs a job execution start instruction by pressing the start key. The job execution start instruction is an instruction to start execution of a job corresponding to a job setting instruction. In this way, the operation panel 13 receives user operation. The user is allowed to input the setting instruction and the job execution start instruction for a job to the operation panel 13.

The printing section 14 includes a sheet feed section 14a, a conveyance section 14b, an image forming section 14c, and a fixing section 14d. In executing printing, the controller 10 controls the sheet feed section 14a to feed a sheet. The controller 10 controls the conveyance section 14b to convey the sheet. The controller 10 controls the image forming section 14c to form a toner image based on image data. The controller 10 further controls the image forming section 14c to transfer the toner image to the sheet that is being conveyed. The controller 10 controls the fixing section 14d to fix the transferred toner image to the sheet. The controller 10 controls the conveyance section 14b to eject the sheet having been subjected to fixing by the fixing section 14d out of the multifunction peripheral 1.

The communication section 15 includes a network communication section 15a and a wireless communication section 15b. The network communication section 15a communicates with the respective communication devices 2 via a cable network. The controller 10 is enabled to transmit and receive data (signals) to and from the respective communication devices 2 by controlling the network communication section 15a. The network communication section 15a includes a circuit for network communication. The network communication section 15a receives print data transmitted from the respective communication devices 2. The print data includes image data and data described in page description language. The controller 10 controls the printing section 14 to perform printing (execute a print job) based on the print data received by the network communication section 15a.

The wireless communication section 15b is capable of communicating with the respective communication devices 2 through wireless communication. The wireless communication section 15b includes a circuit for wireless communication, memory, and an antenna. The controller 10 is enabled to transmit and receive data (signals) to and from the respective communication devices 2 by controlling the wireless communication section 15b.

The first position detection section 16 detects an installation position of the multifunction peripheral 1. For example, the first position detection section 16 detects the position of the multifunction peripheral 1 based on respective GPS signals sent from a plurality of different satellites. The first position detection section 16 includes a processing circuit, memory, and an antenna. The antenna receives the GPS signals. The memory stores therein programs and data for position detection based on the GPS signals. The antenna of the first position detection section 16 receives GPS signals sent from the satellites. The processing circuit computes the current position of the multifunction peripheral 1 based on the GPS signals sent from the different satellites. The controller 10 recognizes the position (coordinates) of the multifunction peripheral 1 based on processing by the first position detection section 16. The first position detection section 16 may detect the position of the multifunction peripheral 1 using signals other than the GPS signals.

The card reader 17 reads an ID card in which a user information set 4 is stored. The card reader 17 reads the user information set 4 from the ID card set in the card reader 17 or held over the card reader 17. User authentication based on the user information set 4 will be described later in detail.

(Communication Devices)

Figure 3:
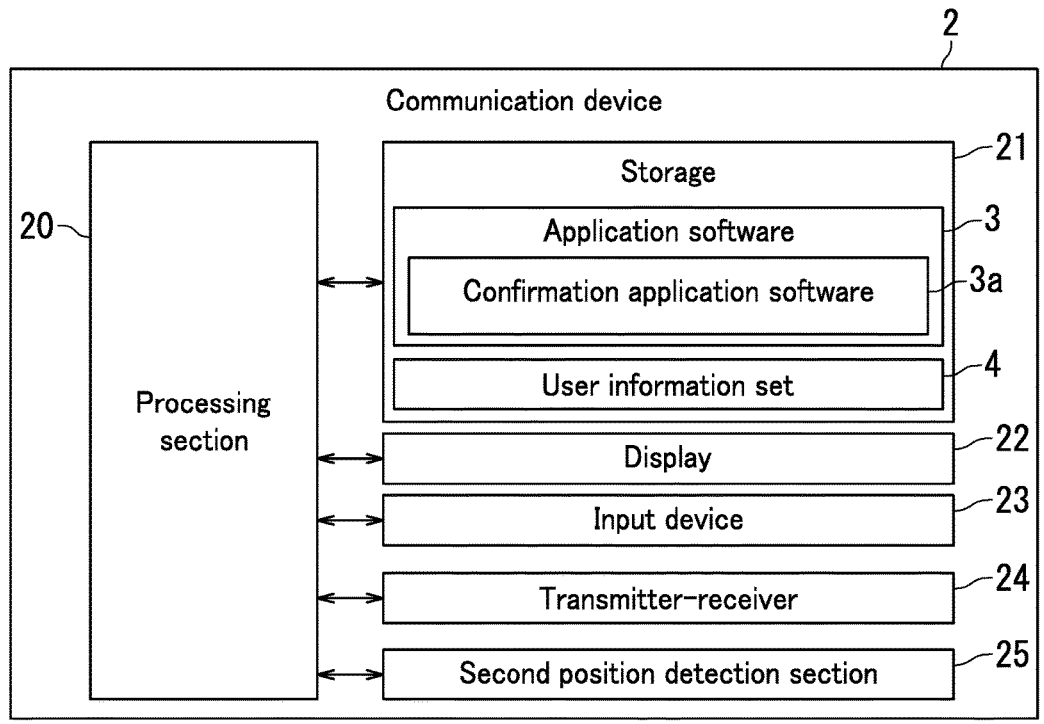
FIG. 3 is a block diagram illustrating an example of a communication device according to the embodiment of the present disclosure.

An example of the communication devices 2 according to the embodiment of the present disclosure will be described next with reference to FIG. 3. FIG. 3 is a block diagram illustrating an example of the communication devices 2.

Each of the communication devices 2 includes a processing section 20, storage 21, a display 22, an input device 23, a transmitter-receiver 24, and a second position detection section 25.

The processing section 20 controls operation of the communication device 2. For example, the processing section 20 is a substrate including a CPU and a system-on-a-chip (SoC). The storage 21 includes ROM, RAM, and flash memory. The storage 21 stores therein control programs, control data, and image data. The storage 21 also stores therein plural pieces of application software 3. The application software 3 includes confirmation application software 3a for confirming use status of the multifunction peripheral 1. The processing section 20 controls operation of the communication device 2 based on an operating system (OS), the programs, the application software 3, or the data each stored in the storage 21 of the communication device 2.

The display 22 displays an image and a screen by being controlled by the processing section 20. The display 22 is a display panel such as a liquid crystal panel or an electroluminescence (EL) panel. The input device 23 receives user operation. The input device 23 may be a device such as a touch panel, a keyboard, or a mouse. Note that any other suitable device may be adopted as the input device 23. The processing section 20 recognizes contents of the user operation based on signals output from the input device 23. For example, the processing section 20 recognizes based on signals output from the input device 23 that an operation image of an icon, a button, a key, a tub, or the like is operated. The user is allowed to activate (utilize) any piece of the application software 3 through operation on the input device 23. The processing section 20 executes a piece of the application software 3 for which activation is requested according to operation input to the input device 23.

The transmitter-receiver 24 communicates with the multifunction peripheral 1. In a configuration in which the communication device 2 performs wireless communication with the multifunction peripheral 1, the transmitter-receiver 24 includes an antenna, a communication circuit, and communication memory. In a configuration in which the communication device 2 performs cable communication with the multifunction peripheral 1, the transmitter-receiver 24 includes a network communication circuit, communication memory, and a socket. The transmitter-receiver 24 performs wireless communications or cable communications for data transmission and receiving to and from the communication section 15 (network communication section 15a or wireless communication section 15b) of the multifunction peripheral 1.

The second position detection section 25 detects the position (e.g., installation position) of the communication device 2. For example, the second position detection section 25 detects the position (coordinates) of the communication device 2 based on respective GPS signals sent from the different satellites. The second position detection section 25 includes a processing circuit, memory, and an antenna that receives the GPS signals. The memory stores therein data and programs for position detection based on the GPS signals. The antenna of the second position detection section 25 receives the GPS signals sent from the satellites. The processing circuit of the second position detection section 25 computes the current position of the communication device 2 based on the GPS signals sent from the different satellites. The processing section 20 recognizes the position (coordinates) of the communication device 2 based on processing by the second position detection section 25.

(User Registration and User Authentication)

Figure 4:
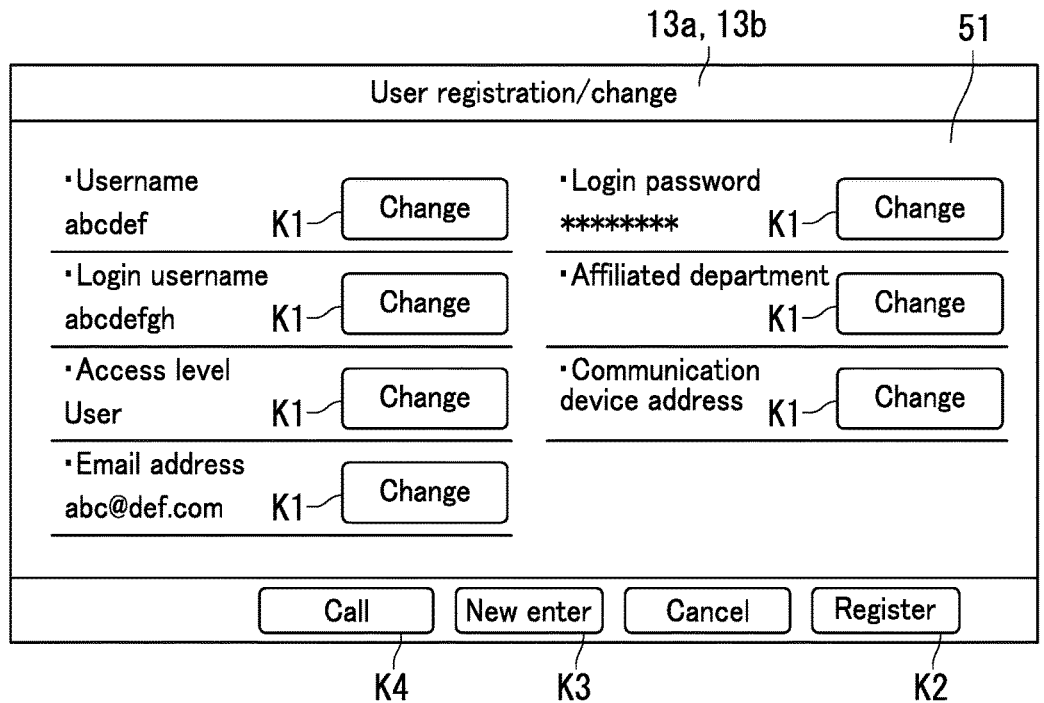
FIG. 4 is a diagram illustrating an example of a user registration screen of the multifunction peripheral according to the embodiment of the present disclosure.

The following describes an example of user registration and user authentication by the multifunction peripheral 1 according to the embodiment of the present disclosure with reference to FIGS. 2 and 4. FIG. 4 is a diagram illustrating an example of a user registration screen 51 of the multifunction peripheral 1.

The controller 10 recognizes a user. In other words, the controller 10 preforms authentication of a user of the multifunction peripheral 1. Authentication enables the controller 10 to recognize a user currently using the multifunction peripheral 1 and a user who has set a currently executed job. Plural pieces of information indicating respective users (user information sets 4) are pre-stored in the multifunction peripheral 1 for user authentication. Registration of a user information set 4 to the multifunction peripheral 1 may be also referred to below as "user registration". Operation on the operation panel 13 can result in pre-registration of a user to the multifunction peripheral 1. For example, the multifunction peripheral 1 executes registration according to operation by an administrator of the multifunction peripheral 1. The registered user information set 4 is stored in the storage 11 (see FIG. 2).

Upon a specific operation being done on the operation panel 13, the controller 10 causes the display panel 13*a* to display the user registration screen 51. As illustrated in FIG. 4, the display panel 13*a* displays items pertaining to a user such as a username, a login password, a login username, an affiliated department, an access level, a communication device address, and an email address. A single change key K1 is provided for each of the items. The administrator presses the change key K1 for a target item for setting. Upon the change key K1 being pressed, the controller 10 causes the display panel 13*a* to display a software keyboard screen. The administrator operates the software keyboard screen to input the contents of the target item for setting. In this manner, the administrator inputs information of the user who is a registration target.

For example, upon the change key K1 for the item of the username being pressed, the controller 10 causes the display panel 13*a* to display the software keyboard screen. The administrator inputs a username indicating the user who is a registration target. FIG. 4 illustrates a situation in which "abcdef" is set as a username of the user.

Upon a registration key K2 being pressed, the controller 10 stores the contents input for respective items to the storage 11 as a user information set 4. Input and registration of a user information set 4 are done for each of users who are permitted to use the multifunction peripheral 1. The controller 10 performs user authentication by referencing the user information sets 4 stored in the storage 11.

Note that pressing a new enter key K3 can cause start of registration of a new user. Upon the new enter key K3 being pressed, the display panel 13*a* is caused to display the user registration screen 51 in which each item is blank for registration of a new user. Pressing a call key K4 allows selection of a registered user and access to the user information set 4 of the selected (registered) user. When the user information set 4 of the registered user is called, the administrator is allowed to operate a change key K1 for an item that is a change target. Pressing the change key K1 can change the contents of the corresponding item of the registered user information set 4. When a user information set 4 is changed, the controller 10 stores the changed user information set 4 to the storage 11.

A user is allowed to confirm the use status of the multifunction peripheral 1 using the communication device 2. The user is allowed to access the multifunction peripheral 1 through the communication device 2. In the above configuration, the communication device address of a communication device 2 that a user uses (possesses) can be pre-registered, as illustrated in FIG. 4. That is, an address is preset that enables specification of the communication device 2. The communication device address herein is for example a media access control (MAC) address of the communication device 2 but may be another type of address. The communication section 15 of the multifunction peripheral 1 acquires the communication device address of the communication device 2 in commutation with the communication device 2. The controller 10 searches for a communication device address that matches the acquired communication device address among those included in the user information sets 4. The controller 10 recognizes the user corresponding to a user information set 4 including the matched communication device address as a user of the communication device 2.

User authentication will be described next. A user is allowed to use the multifunction peripheral 1 when authenticated as a user of the multifunction peripheral 1. When the user is authenticated, the controller 10 causes the operation panel 13 to transition from a logout state (e.g., a state in which operation on the operation panel 13 is restricted) to a login state. The user is allowed to input a job setting instruction to set a job such as copying or data transmission and an job execution start instruction for the job to the operation panel 13 during the time when the user logs in. When the job execution start instruction for the job is input (the start key is pressed) in state in which the operation panel 13 is in the login state, the controller 10 causes the job executing section to start executing the job.

Note that in a situation in which the copy job is executed, document reading and printing are executed. In execution of the copy job, the job executing section accordingly includes the image reading section 12 and the printing section 14. In execution of the scan data transmission job, document reading and image data transmission are executed. In execution of the scan data transmission job, the job executing section accordingly includes the image reading section 12 and the communication section 15.

The controller 10 controls the display panel 13*a* not to display a setting screen pertaining to a job during the time when the operation panel 13 is in the logout state (when no user logs in). The user is accordingly disallowed to input a job setting instruction during the time when the operation panel 13 is in the logout state. Even when the job execution start instruction for a job is input to the operation panel 13, the controller 10 controls the job executing section not to start the job during the time when the operation panel 13 is in the logout state.

A user under authentication (at logging in) is required to input the user's user information set 4 to the operation panel 13. Specifically, the user is required to input user's login username and login password to the multifunction peripheral 1. The user operates the software keyboard screen displayed on the operation panel 13. The touch panel 13*b* receives user input of the login username and the login password. The controller 10 recognizes the input login username and login password based on output from the touch panel 13*b*. Note that the user under authentication may be required to input information of another item among the items of the user information set 4.

The controller 10 performs matching between the input user information set 4 (login username and login password) and the user information sets 4 stored in the storage 11. Specifically, the controller 10 searches for a user corresponding to a user information set 4 that matches the user information set 4 including the input login username and password among the user information sets 4 stored in the storage 11. The controller 10 authenticates the user corresponding to the matched user information set 4 as a user of the multifunction peripheral 1. The controller 10 causes the operation panel 13 to transition to the login state. Upon no match between the input user information set 4 and any of the user information sets 4 stored in the storage 11, the controller 10 causes the operation panel 13 to remain in the logout state. When a specific logout condition is satisfied, the controller 10 also causes the operation panel 13 to transition from the login state to the logout state. For example, after completion of job execution or elapse of a specific time period from the latest operation on the operation panel 13, the controller 10 spontaneously causes the operation panel 13 to transition from the login state to the logout state.

Note that user authentication may be performed using an ID card. In the above configuration, respective users each possess an ID card. The operation panel 13 and the card reader 17 function as an information input section. Specifically, an ID card of a user stores therein a user information set 4 of the user. The user causes the card reader 17 of the multifunction peripheral 1 that the user desires to use to read the ID card. The card reader 17 reads out the user information set 4 stored in the ID card. The controller 10 searches for a user corresponding to the user information set 4 that matches the read user information set 4 among the user information sets 4 stored in the storage 11. The controller 10 authenticates the user corresponding to the matched user information set 4 as a user of the multifunction peripheral 1. The controller 10 causes the operation panel 13 to transition to the login state. Upon no match between the input user information set 4 and any of the user information sets 4 stored in the storage 11, the controller 10 causes the operation panel 13 to remain in the logout state.

(Use Status Confirmation and Use Reservation)

Figure 5:
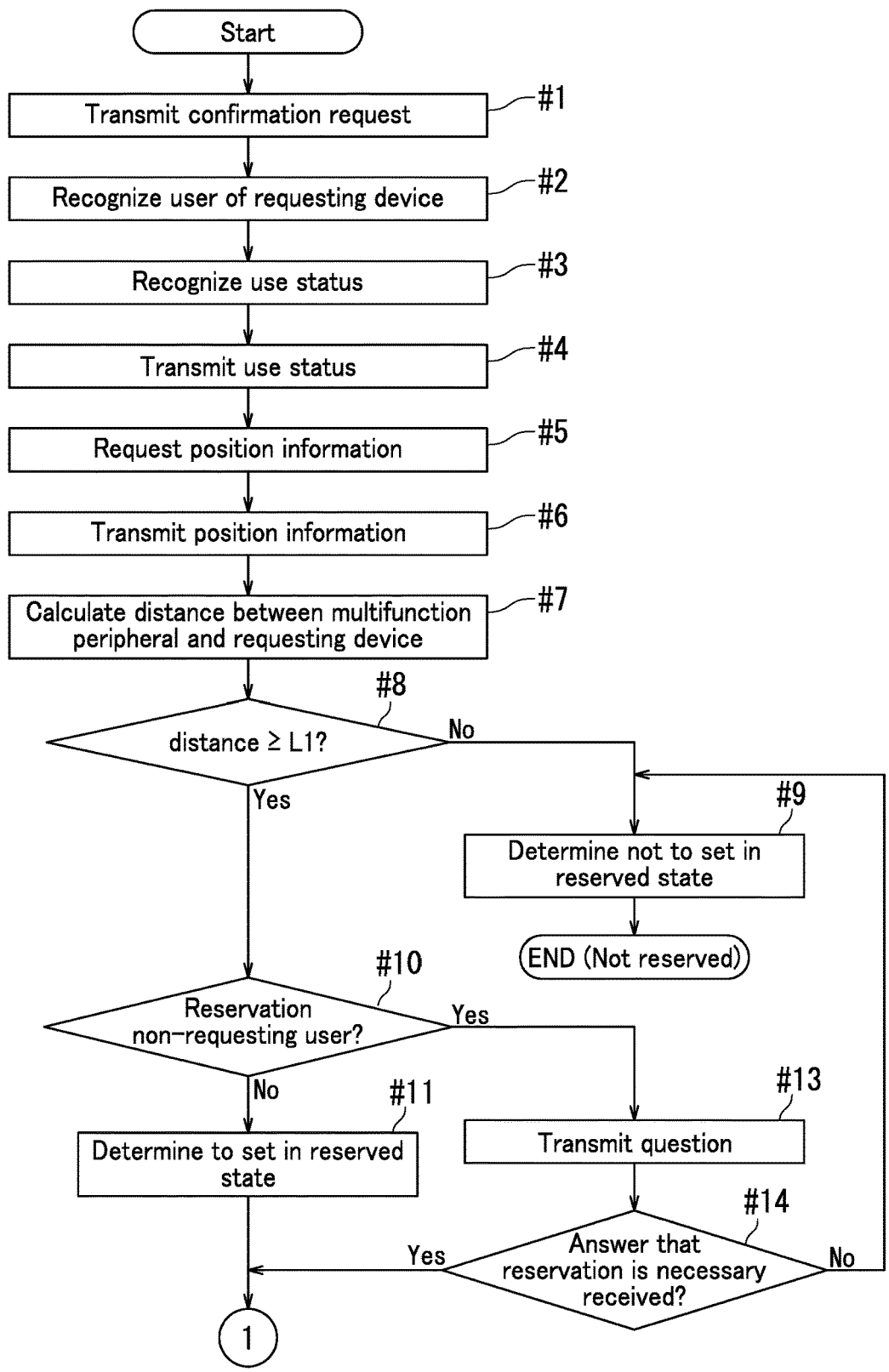
FIG. 5 is a flowchart depicting a former half of an example of a processing flow for confirmation of use status of the multifunction peripheral and use reservation.
Figure 6:
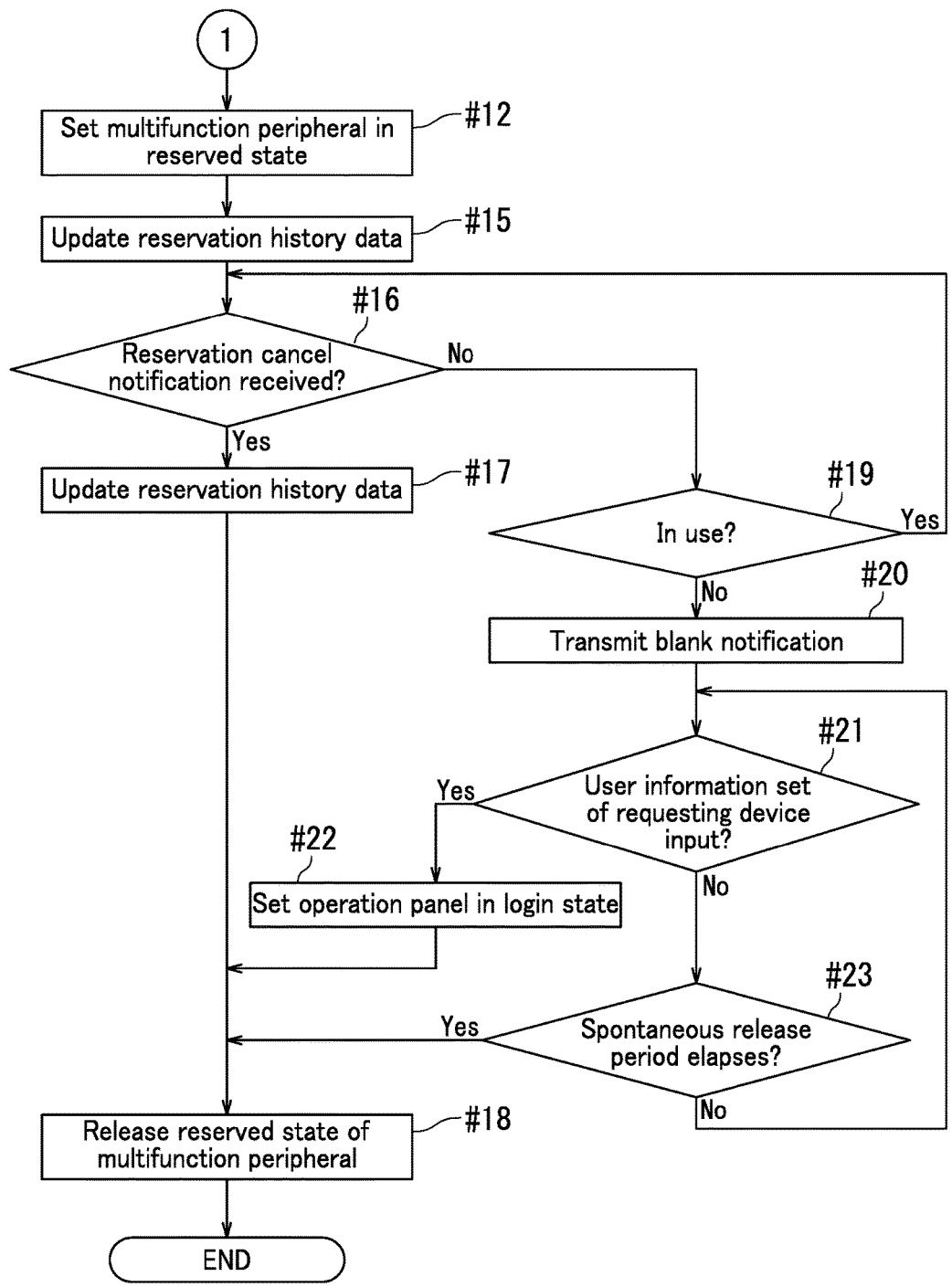
FIG. 6 is a flowchart depicting a latter half of the example of the processing flow for confirmation of the use status of the multifunction peripheral and use reservation.
Figure 7:
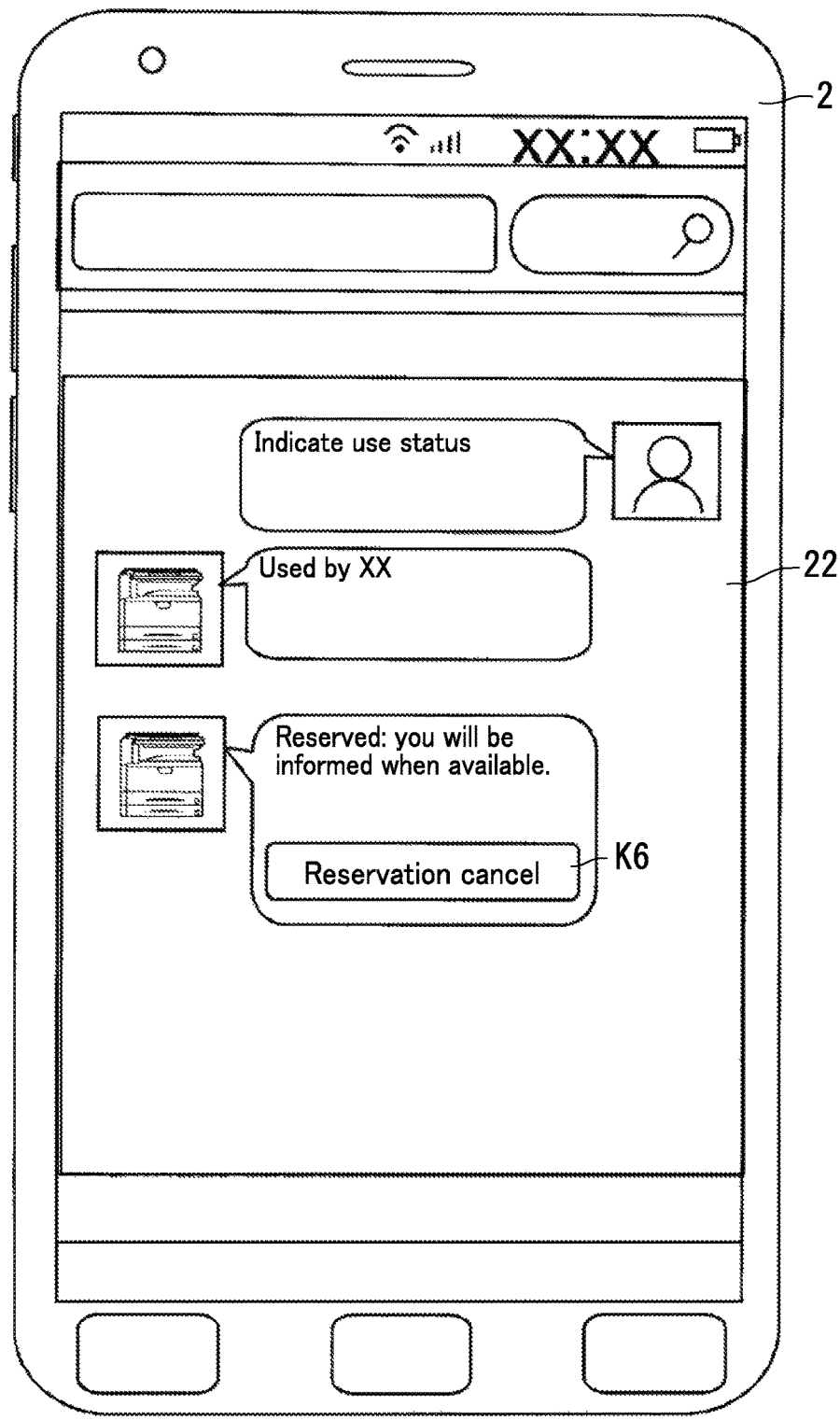
FIG. 7 is a diagram illustrating an example of a screen of the communication device for confirmation of the use status of the multifunction peripheral according to the embodiment of the present disclosure.
Figure 8:
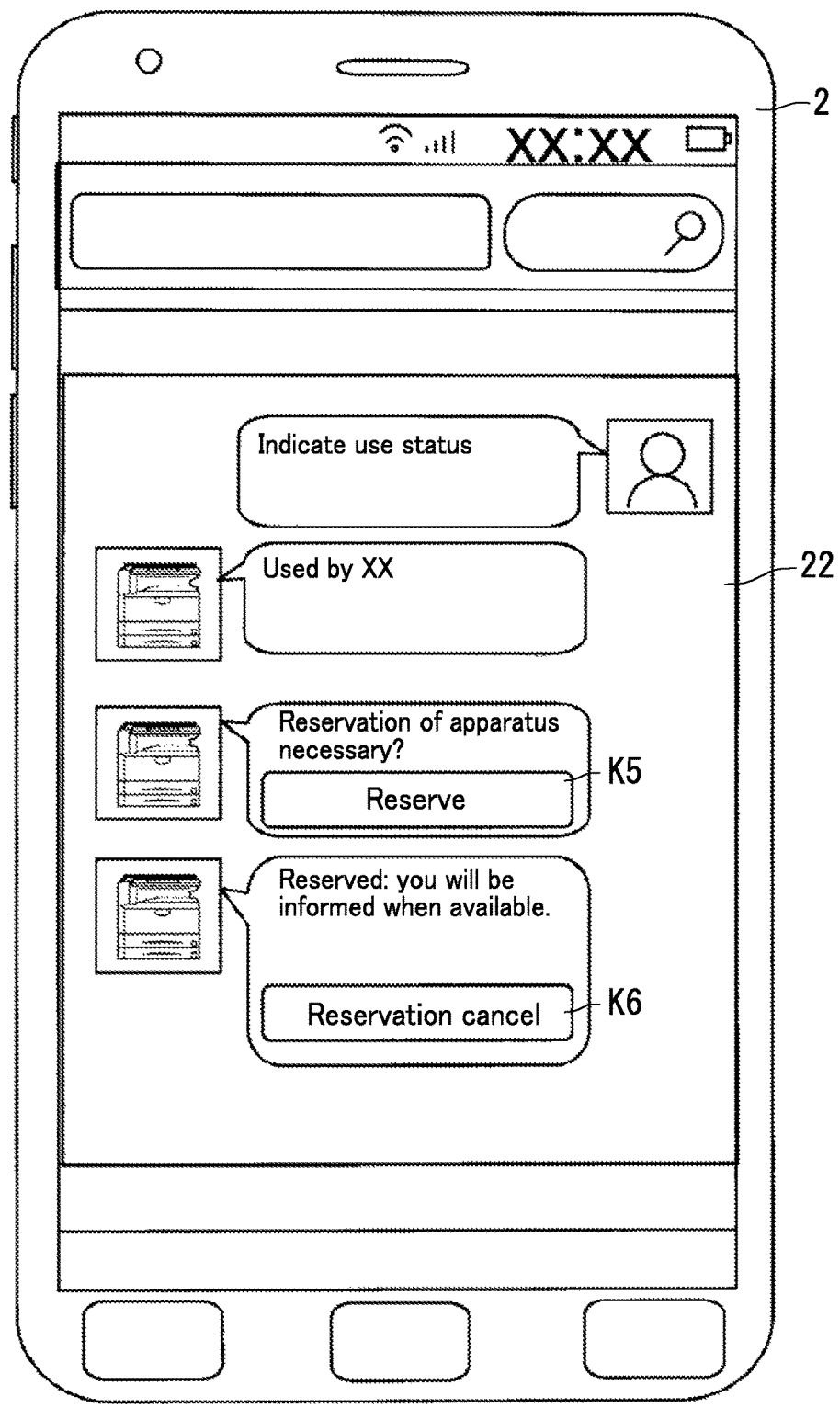
FIG. 8 is a diagram illustrating another example of the screen of the communication device for confirmation of the use status of the multifunction peripheral according to the embodiment of the present disclosure.

The following describes an example of a process flow of confirmation of the use status of the multifunction peripheral 1 and use reservation according to the embodiment of the present disclosure with reference to FIGS. 5 to 9. FIGS. 5 and 6 each are a flowchart depicting the example of the process flow of confirmation of the use status of the multifunction peripheral 1 and use reservation. Note that a series of the process flow is divided into FIGS. 5 and 6. FIGS. 7 and 8 each are a diagram illustrating an example of a use status confirmation screen in the communication device 2. FIG. 9 illustrates an example of reservation history data 6 stored in the storage 11 of the multifunction peripheral 1.

The user is allowed to confirm the use status of the multifunction peripheral 1 using the communication device 2. In other words, the user can confirm the use status of the multifunction peripheral 1 through remote processing via a communication line by operating the smartphone or the PC. It is necessary for the user desiring confirmation of the use status of the multifunction peripheral 1 to activate a piece of application software 3 used for confirming the use status (confirmation application software 3a) in the communication device 2. The user operates the communication device 2 to activate the confirmation application software 3a. In other words, when an instruction to activate the confirmation application software 3a is input to the input device 23, the processing section 20 reads out the confirmation application software 3a for activating the confirmation application software 3a.

The flowchart of FIG. 5 starts from user input for confirmation of the use status of the multifunction peripheral 1 to the input device 23 after activation of the confirmation application software 3a. In other words, the flowchart of FIG. 5 starts at a time point when the user inputs operation to the communication device 2 for questioning the multifunction peripheral 1 about the use status of the multifunction peripheral 1. In response to an input operation as above, the processing section 20 controls the transmitter-receiver 24 to transmit a confirmation request to the communication section 15 of the multifunction peripheral 1 (Step #1). The communication section 15 then receives the confirmation request.

FIGS. 7 and 8 each illustrate the communication device 2 in a state in which the confirmation application software 3a is activated. Note that FIGS. 7 and 8 each illustrate a configuration in which the communication device 2 is a smartphone. The communication device 2 in a state in which the confirmation application software 3a is activated transmits and receives information to and from the multifunction peripheral 1 (image forming apparatus) by chatting. The user questioning the use status inputs a text for questioning the use status. Specifically, when a specific operation (touch on a screen) is input to the input device 23, the processing section 20 causes the display 22 to display the software keyboard screen. The user then inputs the text for questioning the use status through the software keyboard screen. FIGS. 7 and 8 each illustrate an example in a situation in which a text "Indicate use status" is input.

The processing section 20 recognizes a character string forming the input text. The processing section 20 recognizes a user request according to the input text. The processing section 20 recognizes the user request by executing natural language processing. For example, the processing section 20 recognizes the input character string based on syntax analysis and grammar rules. Specifically, the processing section 20 recognizes the input character string as a request based on a portion "Indicate" of the character string that is a verb coming first of the text. The processing section 20 recognizes a portion "use status" of the character string that is a noun coming after the verb as an object. The processing section 20 then recognizes the input character string as a request to confirm the use status of the multifunction peripheral 1 based on the portions "use state" and "Indicate" of the character string. The processing section 20 controls the transmitter-receiver 24 to transmit a confirmation request to the communication section 15 of the multifunction peripheral 1 according to recognition as above.

The controller 10 recognizes the user (requester) of a requesting device that is the communication device 2 having transmitted the confirmation request (Step #2). Specifically, the communication section 15 acquires the communication device address of the requesting device. The controller 10 searches for a user corresponding to the user information set 4 including a communication device address matching the communication device address acquired by the communication section 15 among the user information sets 4. The controller 10 recognizes the searched user as a user (requester) of the requesting device.

Registration of a user information set 4 including for example a username, a login username, and a login password may be enabled by using the confirmation application software 3a. A user information set 4 registered at the communication device 2 is stored in the storage 21 of the communication device 2 in a nonvolatile manner. The processing section 20 may control the transmitter-receiver 24 to transmit to the communication section 15 the user information set 4 stored in the storage 21 together with the confirmation request. In the above configuration, the communication section 15 receives the confirmation request and the user information set 4. The controller 10 is allowed to specify a requester based on the received user information set 4.

The controller 10 recognizes the use status of the multifunction peripheral 1 (Step #3). In a situation in which a certain job is being executed, the controller 10 recognizes that the multifunction peripheral 1 is under job execution. In a situation in which a copy job is being executed, the controller 10 recognizes that the multifunction peripheral 1 is under execution of the copy job. Also, in a situation in which the operation panel 13 is in the login state, the controller 10 recognizes that the multifunction peripheral 1 is in use. In a situation in which no job is executed while the operation panel 13 is in the logout state, the controller 10 recognizes that no user uses the multifunction peripheral 1 and the multifunction peripheral 1 is in a standby state (also referred to below as "the multifunction peripheral 1 being idling"). In a situation in which the multifunction peripheral 1 is reserved, the controller 10 recognizes that the multifunction peripheral 1 is in a reserved state.

Subsequently, the controller 10 controls the communication section 15 to transmit data indicating the use status of the multifunction peripheral 1 to the requesting device (Step #4). That is, the multifunction peripheral 1 transmits the use status to the communication device 2. The transmitter-receiver 24 receives the data. As illustrated in FIGS. 7 and 8, the processing section 20 controls the display 22 to display a message according to the received data. FIGS. 7 and 8 each illustrate an example in a situation in which a message that the multifunction peripheral 1 is in use is displayed in the communication device 2. A message that a job is being executed may be displayed in some case. A message that the multifunction peripheral 1 is idling may be displayed in another case. Alternatively, a message that the multifunction peripheral 1 is in the reserved state may be displayed in still another case.

The controller 10 controls the communication section 15 to transmit a request for position information of the requesting device to the transmitter-receiver 24 (Step #5). The processing section 20 controls the transmitter-receiver 24 to transmit the position information to the communication section 15 in response to the received request (Step #6). The second position detection section 25 of the communication device 2 that has received the request for position information detects the current position of the communication device 2. The processing section 20 controls the transmitter-receiver 24 to transmit the position information indicating the detected current position of the communication device 2 to the communication section 15. Note that the processing section 20 may control the second position detection section 25 to detect the current position of the communication device 2 in advance in a time period from activation of the confirmation application software 3a to Step #5. In the above configuration, the transmitter-receiver 24 is capable of transmitting the position information directly after receipt of the request for position information from the multifunction peripheral 1.

The controller 10 calculates the distance between the multifunction peripheral 1 and the requesting device based on the position information of the requesting device that the communication section 15 has acquired (Step #7). The first position detection section 16 of the multifunction peripheral 1 detects the position (coordinates) of the multifunction peripheral 1. The controller 10 calculates the distance based on the respective coordinates of the requesting device and the multifunction peripheral 1.

The controller 10 determines whether or not the calculated distance is at least a predetermined reference distance L1 (Step #8). The reference distance L1 is for example about 10 to 15 m. When the calculated distance is less than the reference distance L1 (No at Step #8), the controller 10 determines that the multifunction peripheral 1 is not to be set in the reserved state (Step #9). Upon determination that the multifunction peripheral 1 is not to be set in the reserved state, the process flow ends (END). As a result, the multifunction peripheral 1 is not set in the reserved state.

When the calculated distance is at least the reference distance L1 (Yes at Step #8), the controller 10 determines whether or not the user (requester) of the requesting device is a reservation non-requesting user who is a user who does not request reservation (Step #10). The controller 10 performs determination as to a reservation non-requesting user by referencing the reservation history data 6. The reservation history data 6 and determination as to a reservation non-requesting user will be described later in detail.

When the requester is not a reservation non-requesting user (No at Step #10), the controller 10 determines that the multifunction peripheral 1 is to be set in the reserved state (Step #11). The controller 10 then sets the multifunction peripheral 1 to be in the reserved state (Step #12 in FIG. 6). That is, the controller 10 sets the multifunction peripheral 1 to be in the reserved state in order to ensure an opportunity to set the multifunction peripheral 1 to be usable for the requester prior to any other users (also referred to below simply as "ensuring requester use"). The controller 10 may control the communication section 15 to transmit a message that the multifunction peripheral 1 is set in the reserved state when the multifunction peripheral 1 is set in the reserved state. Specifically, the controller 10 controls the communication section 15 to transmit a reservation notification notifying that the multifunction peripheral 1 is reserved to the transmitter-receiver 24 of the requesting device. When the transmitter-receiver 24 receives the reservation notification, the processing section 20 of the requesting device causes the display 22 to display a massage that reservation of the multifunction peripheral 1 is complete (see FIG. 7).

When the requester is a reservation non-requesting user (Yes at Step #10), the controller 10 controls the communication section 15 to transmit a question whether or not reservation is necessary to the transmitter-receiver 24 of the requesting device (Step #13). When the transmitter-receiver 24 receives the question as to whether or not reservation is necessary, the processing section 20 of the requesting device causes the display 22 to display a message corresponding to the question. For example, the third message from above in FIG. 8 ("Reservation of apparatus necessary?") corresponds to the question at Step #13. As illustrated in FIG. 8, the processing section 20 causes the display 22 to display a reservation button K5 that is for answering that reservation is necessary. When the reservation button K5 is pushed, the processing section 20 controls the transmitter-receiver 24 to transmit an answer that reservation is necessary to the communication section 15. That is, the answer that reservation is necessary refers to an answer to the question that indicates necessity of reservation.

The controller 10 determines whether or not the answer that reservation is necessary is received from the requesting device (Step #14). In other words, the controller 10 determines whether or not the reservation button K5 is pushed in the requesting device. Keeping the controller 10 awaiting the answer that reservation is necessary herein increases a processing burden on the controller 10. In view of the foregoing, a time limit for awaiting the answer that reservation is necessary may be provided. Specifically, the controller 10 may be set to await the answer that reservation is necessary until a preset wait period elapses from transmission of the question. When the wait period elapses before the communication section 15 receives the answer that reservation is necessary, the controller 10 makes negative determination at Step #14. Alternatively, the controller 10 may make negative determination at Step #14 when a user other than the user of the requesting device is authenticated.

When the answer that reservation is necessary is not received from the requesting device (No at Step #14), the controller 10 determines that the multifunction peripheral 1 is not to be set in the reserved state (Step #9). The process flow ends then (END). Upon receipt of the answer that reservation is necessary (Yes at Step #14), the controller 10 sets the multifunction peripheral 1 to be in the reserved state (Step #12 in FIG. 6). FIG. 8 indicates an example of a message ("Reserved: you will be informed when available) displayed in the communication device 2 upon the reservation notification being received in response to the answer that reservation is necessary. During the time when the multifunction peripheral 1 is in the reserved state, the controller 10 refuses additional login from a user other than the requester. Even when the user information set 4 of a user other than the requester is input to the information input section, the controller 10 controls the operation panel 13 to remain in a logout state during the time between when the multifunction peripheral 1 is set in the reserved state and when it is released from the reserved state.

It is possible herein that another user has already been logging in to the multifunction peripheral 1 before the multifunction peripheral 1 is set in the reserved state. In other words, it is possible that the other user has already set a job setting instruction through the operation panel 13 of the multifunction peripheral 1 at a time point when the multifunction peripheral 1 is set into the reserved state. The controller 10 controls the operation panel 13 to receive a job setting instruction to set a job and a job execution start instruction for the job for the other user even in a state in which the multifunction peripheral 1 is set in the reserved state. Furthermore, when the other user inputs the job execution start instruction for the job, the controller 10 controls the job executing section to execute the job to the end. In the above configuration, the controller 10 sets the operation panel 13 to be in the logout state along with execution start of the job. Note that when a specific time period elapses from the latest operation on the operation panel 13 by the other user, the controller 10 spontaneously sets the operation panel 13 to be in the logout state.

During the time when the multifunction peripheral 1 is in the reserved state, the controller 10 controls the job executing section not to execute a new job other than a non-restricted job. The non-restricted job refers to a job for which execution start has been instructed by a user who has logged in before the multifunction peripheral 1 is set into the reserved state. The controller 10 does not suspend a job being executed at a time point when the multifunction peripheral 1 is set into the reserved state, and controls the job executing section to execute the job to the end. When the operation panel 13 is in the login state at the end of job execution, the controller 10 causes the operation panel 13 to transition to the logout state.

When the controller 10 sets the multifunction peripheral 1 to be in the reserved state, the controller 10 updates the reservation history data 6 stored in the storage 11 (Step #15). The reservation history data 6 includes a user (requester) who sets the multifunction peripheral 1 to be in the reserved state and date and time at which the multifunction peripheral 1 is set into the reserved state (see FIGS. 1 and 9). The reservation history data 6 is stored in the storage 11 in a one to one correspondence with users.

Subsequently, the controller 10 determines whether or not the communication section 15 receives a reservation cancel notification from the requesting device (Step #16). The reservation cancel notification is transmitted to the communication section 15 from the transmitter-receiver 24 in response to the reservation notification. Upon receipt of the reservation notification, the processing section 20 of the requesting device causes the display 22 to display a reservation cancel button K6 together with a message that the multifunction peripheral 1 is reserved (see FIGS. 7 and 8). When the reservation cancel button K6 is pushed, the processing section 20 causes the transmitter-receiver 24 to transmit the reservation cancel notification.

Upon receipt of the reservation cancel notification (Yes at Step #16), the controller 10 updates the reservation history data 6 stored in the storage 11 (Step #17). The storage 11 adds data indicating reservation cancel to data indicating a reservation event that is canceled. The reservation history data 6 includes history of respective reservation events. Through update at Step #17, data indicating whether or not reservation is canceled is added to respective corresponding reservation events. FIG. 9 indicates the reservation history data 6 in which data indicating that a reservation cancel notification is received is added to each of the first and fourth reservation events from above. When the communication section 15 receives the reservation cancel notification, the controller 10 releases the multifunction peripheral 1 from the reserved state (Step #18). The process flow ends then (END). When the multifunction peripheral 1 is released from the reserved state, any user is allowed to use the multifunction peripheral 1.

Description will be made next about determination as to a reservation non-requesting user at Step #10 in FIG. 5. At Step #10, the controller 10 determines whether or not the requester is a reservation non-requesting user. The controller 10 performs determination by referencing the reservation history data 6. For example, the controller 10 determines whether or not the requester is a reservation non-requesting user according to frequency in receipt of the reservation cancel notification from the requesting device. Specifically, the controller 10 determines a user who has reserved the multifunction peripheral 1 but cancels the reservation the specific number of times in succession to be a reservation non-requesting user. An appropriate number can be set for the specific number of times. The specific number of times is for example three.

In determination at Step #10, the controller 10 determines that any users who each cancel all of the specific number of latest reservation events to be reservation non-requesting users among the users. The controller 10 determines a user who cancels only some of the specific number of the latest reservation events not to be a reservation non-requesting user. The controller 10 then determines whether or not the requester is included in the users determined as the reservation non-requesting users. When the requester is included in the reservation non-requesting users, the controller 10 determines that the requester is a reservation non-requesting user. When the requester is not included in the reservation non-requesting users, the controller 10 determines that the requester is not a reservation non-requesting user.

When the reservation cancel notification is not received (No at Step #16 in FIG. 6), the controller 10 determines whether or not the multifunction peripheral 1 is in use (Step #19). When a job that has been being executed before the multifunction peripheral 1 is set into the reserved state is still under job execution, the controller 10 determines that the multifunction peripheral 1 is in use. When a user having logged in before the multifunction peripheral 1 is set into the reserved state is still logging in, the controller 10 also determines that the multifunction peripheral 1 is in use. When a job for which a user having logged in before the multifunction peripheral 1 is set into the reserved state inputs a job execution start instruction is still under execution by the job executing section, the controller 10 determines that the multifunction peripheral 1 is in use. When the job executing section executes no job and the operation panel 13 is in the logout state, the controller 10 determines that the multifunction peripheral 1 is not in use.

When the controller 10 determines that the multifunction peripheral 1 is in use (Yes at Step #19), the flow returns to Step #16. When the controller 10 determines that the multifunction peripheral 1 is not in use (No at Step #19), the controller 10 controls the communication section 15 to transmit a blank notification (Step #20). The blank notification notifies that the multifunction peripheral 1 is available. Specifically, the controller 10 controls the communication section 15 to transmit the blank notification to the transmitter-receiver 24 of the requesting device. When the transmitter-receiver 24 receives the blank notification, the processing section 20 causes the display 22 to display a message that the multifunction peripheral 1 is available. Displaying the message makes the user to recognize that the multifunction peripheral 1 is not in use.

When the multifunction peripheral 1 becomes available, the requester is allowed to use the multifunction peripheral 1. Then, the controller 10 determines whether or not the user information set 4 of the requester is input (Step #21). In other words, the controller 10 determines whether or not the requester logs in. Specifically, the controller 10 determines the presence or absence of input of the user information set 4 (login username and login password) of the requester to the operation panel 13. Alternatively, the controller 10 determines whether or not the card reader 17 reads an ID card storing the user information set 4 of the requester.

When the user information set 4 of the requester is input (Yes at Step #21), the controller 10 causes the operation panel 13 to transition to the login state through login by the requester (Step #22). The controller 10 then releases the multifunction peripheral 1 from the reserved state (Step #18). The process flow ends then. Release of the multifunction peripheral 1 from the reserved state allows the requester to input to a job setting instruction to set a job to the operation panel 13. The requester is further allowed to cause execution of the job by inputting the job execution start instruction for the job to the multifunction peripheral 1. In the above configuration, the requester can use the multifunction peripheral 1 without awaiting completion of a job of another user that is being executed.

When the user information set 4 of the requester is not input (No at Step #21), the controller 10 determines whether or not a preset spontaneous release period elapses from receipt of the blank notification (Step #23). The spontaneous release period refers to a time period for which processing for spontaneously releasing the reserved state of the multifunction peripheral 1 is postponed. When the multifunction peripheral 1 is in the reserved state, any other user is disallowed to use the multifunction peripheral 1. A situation is not favorable in which the reserved state lasts long. In other words, another user may be disallowed to use the multifunction peripheral 1 for too long time. The spontaneous release period can be appropriately set. The spontaneous release time is for example about one to several (three) minutes.

In view of the foregoing, when the preset spontaneous release period elapses from receipt of the blank notification (Yes at Step #23), the controller 10 releases the multifunction peripheral 1 from the reserved state (Step #18). Then, the process flow ends. In other words, the controller 10 spontaneously stops ensuring requester's use. On the other hand, when the preset spontaneous release period does not yet elapse from receipt of the blank notification (No at Step #23), the flow returns to Step #21.

(Setting Pertaining to Reservation on User by User Basis)

The following describes an example of setting pertaining to reservation on a user by user basis in the multifunction peripheral 1 according to the embodiment of the present disclosure with reference to FIG. 10. FIG. 10 illustrates an example of a reservation detail setting screen 52 in the multifunction peripheral 1.

A detailed setting instruction pertaining to use reservation can be input to the multifunction peripheral 1 on a user by user basis. The reservation detail setting screen 52 receives input of a detailed setting instruction pertaining to use reservation. The multifunction peripheral 1 is capable of displaying the reservation detail setting screen 52. That is, when specific operation is done on the touch panel 13b or one of the hard keys 13c, the controller 10 causes the display panel 13a to display the reservation detail setting screen 52. Note that when user registration is done on the user registration screen 51, the controller 10 may cause the display panel 13a to display the reservation detail setting screen 52 for a user for which the user registration is done.

The reservation detail setting screen 52 includes a user display field C1, a user selection key K7, an allowance key K8, a disallowance key K9, a reference distance input field C2, a history reference activation key K10, and a history reference inactivation key K11. For example, the administrator of the multifunction peripheral 1 inputs a setting instruction through the reservation detail setting screen 52.

The controller 10 causes the username of a target user for which detailed setting pertaining to use reservation is to be set to be displayed in the user display field C1. When the user selection key K7 is pressed, the controller 10 causes the display panel 13a to display a list of registered users. The administrator is allowed to select a user who is a target to be set for reservation setting from the list. FIG. 10 illustrates a situation in which a user having a username "abcdef" is selected.

The allowance key K8 or the disallowance key K9 is used to set allowance or disallowance of reservation at the multifunction peripheral 1 to a selected user. The allowance key K8 is for allowance of reservation at the multifunction peripheral 1. The disallowance key K9 is for disallowance of any reservation at the multifunction peripheral 1. The operation panel 13 receives a setting instruction as to whether or not reservation at the multifunction peripheral 1 is allowed on a user by user basis. In reservation by a requester for whom a setting instruction has been input to the allowance key K8, the controller 10 sets the multifunction peripheral 1 in the reserved state.

When the reference distance input field C2 is operated, the controller 10 causes the display panel 13a to display a software keyboard screen for numeral input. The administrator inputs a numeral through the software keyboard screen. Through input of the numeral as above, a reference distance L1 for the selected user can be set. That is, the operation panel 13 receives a setting instruction about the reference distance L1 on a user by user basis. The storage 11 stores therein the reference distance L1 set for each user (see FIG. 1). The controller 10 determines whether or not to set the multifunction peripheral 1 to be in the reserved state according to the reference distance L1 set for the requester.

The history reference activation key K10 is pressed for execution of determination as to whether or not the multifunction peripheral 1 is to be set in the reserved state by referencing the reservation history data 6. When the requester who tries to reserve the multifunction peripheral 1 is a user for whom the history reference activation key K10 has been pressed, Step #10 in the flowchart of FIG. 5 is executed. When execution at Step #10 results in positive determination, Steps #13 and #14 are executed.

The history reference inactivation key K11 is pressed for execution of determination as to whether or not the multifunction peripheral 1 is to be set in the reserved state without referencing the reservation history data 6. When the requester who tries to reserve the multifunction peripheral 1 is a user for whom the history reference inactivation key K11 has been pressed, Step #10 is skipped in the flowchart of FIG. 5. In other words, when the distance between the requesting device and the multifunction peripheral 1 is at least the reference distance L1, the controller 10 sets the multifunction peripheral 1 to be in the reserved state. Through the above, setting as to whether or not to use the reservation history data 6 can be done. In the above configuration, reservation readiness (priority in getting reservation at the multifunction peripheral 1) can be differentiated among the users.

As described above, the image forming apparatus according to the embodiment of the present disclosure includes the communication section 15, the operation panel 13, the job executing section (image reading section 12, image forming section 14c, and communication section 15), the information input section (operation panel 13 and card reader 17), the storage 11, and the controller 10. The communication section 15 communicates with one or more communication devices 2. The operation panel 13 receives the job setting instruction and the job execution start instruction. The job executing section executes the job. The storage 11 stores therein the respective user information sets 4 of one or more users. The information input section receives input of a user information set 4 of a user among the one or more users. The controller 10 performs matching between the user information set 4 input to the information input section and the user information sets 4 pre-stored in the storage 11 for user authentication. The operation panel 13 in the logout state does not receive the job setting instruction and the job execution start instruction. The operation panel 13 in the login state receives the job setting instruction and the job execution start instruction. Upon the communication section 15 receiving the confirmation request that is a request to confirm the use status of the image forming apparatus from one of the one or more communication devices 2, the controller 10 specifies based on communication with the requesting device a requester who is a user of a requesting device as one of the one or more communication devices that has transmitted the confirmation request. The controller 10 determines whether or not the image forming apparatus is to be set in the reserved state based on the communication with the requesting device. Upon determination that the image forming apparatus is to be set in the reserved state, the controller 10 sets the image forming apparatus to be in the reserved state. Upon determination that the image forming apparatus is not to be set in the reserved state, the controller 10 does not set the image forming apparatus to be in the reserved state. When a user information set 4 of the requester is input to the information input section in a state in which the image forming apparatus is in the reserved state, the controller 10 causes the operation panel 13 to transition from the logout state to the login state. The controller 10 refuses additional login from a user other than the requester during the time when the image forming apparatus is in the reserved state.

In the above configuration, a person who desires to use the image forming apparatus can reserve the image forming apparatus only by requesting confirmation of the use status of the image forming apparatus. No bothersome operation such as complicated input and setting for use reservation is required of a user who desires use reservation. As such, easy setting of use reservation of the image forming apparatus can be achieved. The image forming apparatus can automatically determine whether or not to allow reservation. The image forming apparatus is not necessarily set in the reserved state whenever the confirmation request is received. That is, the image forming apparatus can automatically determine whether or not to set itself to be in the reserved state.

A user at a location distant from the image forming apparatus is in difficulty in confirming the use status of the image forming apparatus in many cases. Furthermore, it is possible that in a situation in which a user located distant from the image forming apparatus moves toward the image forming apparatus, another user starts using the image forming apparatus. In short, interruption by the other user may occur before the user reaches the image forming apparatus. By contrast, the shorter the distance between the image forming apparatus and a user is, the more easily the user can confirm the use status of the image forming apparatus according to operation sound of the image forming apparatus or by visual check. In view of the foregoing, the controller 10 controls the communication section 15 to acquire position information indicating the position of the requesting device from the requesting device upon the communication section 15 receiving the confirmation request. The controller 10 calculates the distance between the image forming apparatus and the requesting device based on the acquired position information. When the calculated distance is at least the preset reference distance L1, the controller 10 determines that the image forming apparatus is to be set in the reserved state. When the calculated distance is less than the preset reference distance L1, the controller 10 determines that the image forming apparatus is not to be set in the reserved state. In the above configuration, a user distant from the image forming apparatus can set the image forming apparatus to be in the reserved state only by requesting confirmation. This can obviate repetitive check of the use status of the image forming apparatus by the user distant from the image forming apparatus. Furthermore, user's annoyance at interruption by another user before the user reaches the image forming apparatus can be also obviated.

The operation panel 13 receives the setting instruction to set the reference distance L1 for each of the one or more users. The storage 11 stores therein the reference distance L1 set for each of the one or more users. Upon the communication section 15 receiving the confirmation request, the controller 10 determines whether or not the image forming apparatus is to be set in the reserved state according to the reference distance L1 set for the requester. The administrator is allowed to set the reference distance L1 for each user. Reservation readiness can be set on a user by user basis by adjusting values of the reference distances L1 for the respective users. For example, a user located close to the image forming apparatus can easily check the available status or the use status of the image forming apparatus and therefore has less need for reserving the image forming apparatus. The reference distance L1 for such a user is set longer than the distance between the user location and the image forming apparatus. Through setting as above, the image forming apparatus is not set in the reserved state even when the user transmits the confirmation request from the user location. By contrast, a user located distantly from the image forming apparatus is in difficulty in checking the available status or the use status of the image forming apparatus and therefore has more need for reserving the image forming apparatus. The reference distance L1 for such a user is set shorter than the distance between the user location and the image forming apparatus. Through setting as above, use of the image forming apparatus by the user distant therefrom can be ensured.

When the controller 10 sets the image forming apparatus to be set in the reserved state, the controller 10 controls the communication section 15 to transmit the reservation notification to the requesting device. Upon receipt of the reservation cancel notification from the requesting device in response to the reservation notification, the controller 10 releases the image forming apparatus from the reserved state. In the above configuration, a situation in which the image forming apparatus is unnecessarily set in the reserved state can be avoided.

The controller 10 causes the storage 11 to store the reservation history data 6 including a history event indicating receipt of the reservation cancel notification for each of the one or more communication devices 2. The controller 10 determines by referencing the reservation history data 6 whether or not the requester is a reservation non-requesting user. When the requester is a reservation non-requesting user, the controller 10 determines that the image forming apparatus is not to be set in the reserved state. In the above configuration, whether or not the image forming apparatus is to be set in the reserved state can be determined based on past user operation (response history from the communication device 2). The image forming apparatus can be restricted from being set in the reserved state when it is highly possible that a response of reservation being unnecessary is received from the requester.

Furthermore, when the setting instruction to reference the reservation history data 6 in determination as to whether or not the image forming apparatus is to be set in the reserved state is input to the operation panel 13, the controller 10 determines by referencing the reservation history data 6 whether or not the image forming apparatus is to be set in the reserved state. When the setting instruction not to reference the reservation history data 6 in determination as to whether or not the image forming apparatus is to be set in the reserved state is input to the operation panel 13, the controller 10 determines whether or not the image forming apparatus is to be set in the reserved state without referencing the reservation history data 6. In the above configuration, whether or not to use the reservation history data 6 in the determination can be selected.

Upon receiving the confirmation request from a communication device 2 of the reservation non-requesting user among the one or more communication devices, the controller 10 controls the communication section 15 to transmit to the requesting device the question whether or not it is necessary to set the image forming apparatus to be in the reserved state. Upon the communication section 15 receiving the answer that reservation is necessary in response to the question, the controller 10 sets the image forming apparatus to be in the reserved state. In the above configuration, the image forming apparatus can be set in the reserved state for a user who highly possibly answers that reservation is unnecessary only after confirming intention of the user. Accordingly, a situation in which the image forming apparatus is set in the reserved state in spite of reservation being unnecessary can be prevented.

Upon the communication section 15 receiving the confirmation request, the controller 10 controls the communication section 15 to transmit the use status of the image forming apparatus to the requesting device. In the above configuration, the user of the requesting device can be notified of the use status of the image forming apparatus.

Any user other than the user who has transmitted the confirmation request is disabled to use the image forming apparatus during the time when the image forming apparatus is set in the reserved state. In the above situation, every user other than the user who has transmitted the confirmation request is disallowed to use the image forming apparatus. In view of the foregoing, upon determination that the image forming apparatus is not in use after the image forming apparatus is set in the reserved state, the controller 10 controls the communication section 15 to transmit the blank notification to the requesting device. When the information input section does not receive input of the user information set 4 of the requester until the preset spontaneous release period elapses from transmission of the blank notification by the communication section 15, the controller 10 releases the image forming apparatus from the reserved state. In the above configuration, a situation in which the other user is disabled to use the image forming apparatus for a long period of time can be prevented.

The present disclosure can be adopted to the image forming system 100. Specifically, the image forming system 100 includes the one or more communication devices 2 and the image forming apparatus. The image forming apparatus includes the communication section 15, the operation panel 13, the job executing section (image reading section 12, image forming section 14c, and communication section 15), the information input section (operation panel 13 and card reader 17), the storage 11, and the controller 10. The communication section 15 communicates with the one or more communication devices 2. The operation panel 13 receives the job setting instruction and the job execution start instruction. The job executing section executes the job. The storage 11 pre-stores therein respective user information sets 4 of one or more users. The information input section receives input of a user information set 4 of a user among the one or more users. The controller 10 performs matching between the user information set 4 input to the information input section and the user information sets 4 pre-stored in the storage 11 for user authentication. The operation panel 13 in the logout state does not receive the job setting instruction and the job execution start instruction. The operation panel 13 in the login state receives the job setting instruction and the job execution start instruction. Upon the communication section 15 receiving the confirmation request that is the request to confirm the use status of the image forming apparatus from one of the one or more communication devices 2, the controller 10 specifies, based on communication with the requesting device, a requester who is a user of the requesting device that is one of the one or more communication devices 2 that has transmitted the confirmation request. The controller 10 determines whether or not the image forming apparatus is to be set in the reserved state based on communication with the requesting device. Upon determination that the image forming apparatus is to be set in the reserved state, the controller 10 sets the image forming apparatus to be in the reserved state. Upon determination that the image forming apparatus is not to be set in the reserved state, the controller 10 does not set the image forming apparatus to be in the reserved state. When the user information set 4 of the requester is input to the information input section in the state in which the image forming apparatus is in the reserved state, the controller 10 causes the operation panel 13 to transition from the logout state to the login state. The controller 10 refuses additional login from a user other than the requester during the time when the image forming apparatus is in the reserved state.

The embodiment of the present disclosure has been described so far. However, the scope of the present disclosure is of course not limited to the embodiment and various alterations may be adopted in implementation so long as such alterations do not deviate from the essence of the present disclosure.

What is claimed is:

1. An image forming apparatus comprising:
a communication section configured to communicate with one or more communication devices;
an operation panel that receives a job setting instruction to set a job and a job execution start instruction to start execution of the job;
a job executing section configured to execute the job;
storage that pre-stores therein respective user information sets of one or more users;
an information input section that receives input of a user information set of a user among the one or more users; and
a controller configured to perform matching between the user information set input to the information input section and the user information sets pre-stored in the storage for user authentication, wherein
the operation panel in a logout state does not receive the job setting instruction and the job execution start instruction,
the operation panel in a login state receives the job setting instruction and the job execution start instruction,
upon the communication section receiving a confirmation request that is a request to confirm use status of the image forming apparatus from one of the one or more communication devices, the controller
specifies a requester based on communication with a requesting device, the requester being a user of the requesting device, the requesting device being the one of the one or more communication devices that has transmitted the confirmation request, and
determines whether or not the image forming apparatus is to be set in a reserved state based on communication with the requesting device,
upon determination that the image forming apparatus is to be set in the reserved state, the controller sets the image forming apparatus to be in the reserved state,
upon determination that the image forming apparatus is not to be set in the reserved state, the controller does not set the image forming apparatus to be in the reserved state,
when the controller sets the image forming apparatus to be in the reserved state, the controller controls the communication section to transmit a reservation notification to the requesting device, the reservation notification notifying that the image forming apparatus is set in the reserved state,
upon receipt of a reservation cancel notification from the requesting device in response to the reservation notification, the controller releases the image forming apparatus from the reserved state, the reservation cancel notification being a request for release of the reserved state,
the storage stores therein reservation history data for each of the one or more communication devices, the reservation history data including a history event indicating receipt of the reservation cancel notification,
the controller determines by referencing the reservation history data whether or not the requester is a reservation non-requesting user,
when the requester is the reservation non-requesting user, the controller determines that the image forming apparatus is not to be set in the reserved state,
when a user information set of the requester is input to the information input section in a state in which the image forming apparatus is in the reserved state, the controller causes the operation panel to transition from the logout state to the login state, and
during time when the image forming apparatus is in the reserved state, the controller refuses additional login from a user other than the requester.

2. The image forming apparatus according to claim 1, wherein
upon the communication section receiving the confirmation request, the controller
controls the communication section to acquire position information indicating a position of the requesting device from the requesting device, and
calculates a distance between the image forming apparatus and the requesting device based on the position information,
when the distance is at least a preset reference distance, the controller determines that the image forming apparatus is to be set in the reserved state, and
when the distance is less than the preset reference distance, the controller determines that the image forming apparatus is not to be set in the reserved state.

3. The image forming apparatus according to claim 2, wherein
the operation panel receives a setting instruction to set a reference distance for each of the one or more users,
the storage stores therein the reference distance set for each of the one or more users, and
upon the communication section receiving the confirmation request, the controller determines whether or not the image forming apparatus is to be set in the reserved state according to a reference distance set for the requester.

4. The image forming apparatus according to claim 1, wherein
when a setting instruction to reference the reservation history data in determination as to whether or not the image forming apparatus is to be set in the reserved state is input to the operation panel, the controller determines by referencing the reservation history data whether or not the image forming apparatus is to be set in the reserved state, and
when a setting instruction not to reference the reservation history data in determination as to whether or not the image forming apparatus is to be set in the reserved state is input to the operation panel, the controller determines whether or not the image forming apparatus is to be set in the reserved state without referencing the reservation history data.

5. The image forming apparatus according to claim 1, wherein
upon the communication section receiving the confirmation request from a communication device of the reservation non-requesting user among the one or more communication devices, the controller controls the communication section to transmit to the requesting device a question whether or not it is necessary to set the image forming apparatus to be in the reserved state, and upon the communication section receiving an answer that reservation is necessary in response to the question, the controller sets the image forming apparatus to be in the reserved state.

6. The image forming apparatus according to claim 1, wherein upon the communication section receiving the confirmation request, the controller controls the communication section to transmit the use status of the image forming apparatus to the requesting device.

7. The image forming apparatus according to claim 1, wherein the user information sets pre-stored in the storage each include a username for logging in, a password for logging in, and a communication device address for specifying a communication device corresponding to the user information set.

8. The image forming apparatus according to claim 1, wherein the controller determines whether or not the requester is the reservation non-requesting user according to frequency in receipt of the reservation cancel notification from the requesting device.

9. An image forming apparatus comprising:

a communication section configured to communicate with one or more communication devices;

an operation panel that receives a job setting instruction to set a job and a job execution start instruction to start execution of the job;

a job executing section configured to execute the job;

storage that pre-stores therein respective user information sets of one or more users;

an information input section that receives input of a user information set of a user among the one or more users; and a controller configured to perform matching between the user information set input to the information input section and the user information sets pre-stored in the storage for user authentication, wherein the operation panel in a logout state does not receive the job setting instruction and the job execution start instruction, the operation panel in a login state receives the job setting instruction and the job execution start instruction, upon the communication section receiving a confirmation request that is a request to confirm use status of the image forming apparatus from one of the one or more communication devices, the controller specifies a requester based on communication with a requesting device, the requester being a user of the requesting device, the requesting device being the one of the one or more communication devices that has transmitted the confirmation request, and determines whether or not the image forming apparatus is to be set in a reserved state based on communication with the requesting device, upon determination that the image forming apparatus is to be set in the reserved state, the controller sets the image forming apparatus to be in the reserved state, upon determination that the image forming apparatus is not to be set in the reserved state, the controller does not set the image forming apparatus to be in the reserved state, when a user information set of the requester is input to the information input section in a state in which the image forming apparatus is in the reserved state, the controller causes the operation panel to transition from the logout state to the login state, during time when the image forming apparatus is in the reserved state, the controller refuses additional login from a user other than the requester, upon determination that the image forming apparatus is not in use after the image forming apparatus is set in the reserved state, the controller controls the communication section to transmit a blank notification to the requesting device, the blank notification notifying that the image forming apparatus is not in use, and when the information input section does not receive input of the user information set of the requester until a preset spontaneous release period elapses from transmission of the blank notification by the communication section, the controller releases the image forming apparatus from the reserved state.

10. The image forming apparatus according to claim 9, wherein upon the communication section receiving the confirmation request, the controller controls the communication section to acquire position information indicating a position of the requesting device from the requesting device, and calculates a distance between the image forming apparatus and the requesting device based on the position information, when the distance is at least a preset reference distance, the controller determines that the image forming apparatus is to be set in the reserved state, and when the distance is less than the preset reference distance, the controller determines that the image forming apparatus is not to be set in the reserved state.

11. The image forming apparatus according to claim 10, wherein the operation panel receives a setting instruction to set a reference distance for each of the one or more users, the storage stores therein the reference distance set for each of the one or more users, and upon the communication section receiving the confirmation request, the controller determines whether or not the image forming apparatus is to be set in the reserved state according to a reference distance set for the requester.

12. The image forming apparatus according to claim 9, wherein upon the communication section receiving the confirmation request, the controller controls the communication section to transmit the use status of the image forming apparatus to the requesting device.

13. The image forming apparatus according to claim 9, wherein the user information sets pre-stored in the storage each include a username for logging in, a password for logging in, and a communication device address for specifying a communication device corresponding to the user information set.

14. An image forming system comprising:

one or more communication devices; and an image forming apparatus, wherein the image forming apparatus includes:

a communication section configured to communicate with the one or more communication devices;

an operation panel that receives a job setting instruction to set a job and a job execution start instruction to start execution of the job;

a job executing section configured to execute the job;

storage that pre-stores therein respective user information sets of one or more users;

an information input section that receives input of a user information set of a user among the one or more users; and a controller configured to perform matching between the user information set input to the information input section and the user information sets pre-stored in the storage for user authentication, the operation panel in a logout state does not receive the job setting instruction and the job execution start instruction, the operation panel in a login state receives the job setting instruction and the job execution start instruction, upon the communication section receiving a confirmation request that is a request to confirm use status of the image forming apparatus from one of the one or more communication devices, the controller specifies a requester based on communication with a requesting device, the requester being a user of the requesting device, the requesting device being the one of the one or more communication devices that has transmitted the confirmation request, and determines whether or not the image forming apparatus is to be set in a reserved state based on communication with the requesting device, upon determination that the image forming apparatus is to be set in the reserved state, the controller sets the image forming apparatus to be in the reserved state, upon determination that the image forming apparatus is not to be set in the reserved state, the controller does not set the image forming apparatus to be in the reserved state, when the controller sets the image forming apparatus to be in the reserved state, the controller controls the communication section to transmit a reservation notification to the requesting device, the reservation notification notifying that the image forming apparatus is set in the reserved state, upon receipt of a reservation cancel notification from the requesting device in response to the reservation notification, the controller releases the image forming apparatus from the reserved state, the reservation cancel notification being a request for release of the reserved state, the storage stores therein reservation history data for each of the one or more communication devices, the reservation history data including a history event indicating receipt of the reservation cancel notification, the controller determines by referencing the reservation history data whether or not the requester is a reservation non-requesting user, when the requester is the reservation non-requesting user, the controller determines that the image forming apparatus is not to be set in the reserved state, when a user information set of the requester is input to the information input section in a state in which the image forming apparatus is in the reserved state, the controller causes the operation panel to transition from the logout state to the login state, and during time when the image forming apparatus is in the reserved state, the controller refuses additional login from a user other than the requester.

* * * * *